United States Patent [19]

Schine

[11] Patent Number: 4,660,074
[45] Date of Patent: Apr. 21, 1987

[54] NTSC COLOR TELEVISION TRANSMISSION WITHOUT CHROMA CRAWL

[76] Inventor: Jonathan M. Schine, 626 S. Hudson Ave., Los Angeles, Calif. 90005

[21] Appl. No.: 787,156

[22] Filed: Oct. 15, 1985

[51] Int. Cl.[4] .................... H04N 9/44; H04N 11/14
[52] U.S. Cl. ..................................... 358/16; 358/17
[58] Field of Search .................. 358/11, 12, 16, 17

[56] References Cited

U.S. PATENT DOCUMENTS

| | | | |
|---|---|---|---|
| 3,581,011 | 5/1971 | Ward | 358/17 |
| 4,051,532 | 9/1977 | Hilbert | 358/142 |
| 4,295,157 | 10/1981 | Machida et al. | 358/17 |
| 4,500,908 | 2/1985 | Mandeberg | 358/11 |
| 4,517,587 | 5/1985 | Aizawa et al. | 358/17 |
| 4,558,349 | 12/1985 | Sasuki | 358/17 |

FOREIGN PATENT DOCUMENTS 1214333 12/1970 United Kingdom ................. 358/17

Primary Examiner—John W. Shepperd
Attorney, Agent, or Firm—Freilich, Hornbaker, Rosen & Fernandez

[57] ABSTRACT

An improved color television transmission compatible with NTSC standards produces a controlled horizontal scan rate at about 15,768 Hz with 227 cycles of color subcarrier per line, and a controlled horizontal scan rate at about 60.070 Hz to produce frames of two interlaced fields each at a rate of about 30.035 Hz with 227.5 cycles of the color subcarrier per field phase shifted 180° of the color subcarrier at the beginning of each field, thereby eliminating "chroma crawl," and reducing the size of the teeth in the "zipper" effect produced by NTSC encoded color at the edge of vertical color borders. The vertical scan rate is controlled by dividing a clock frequency of four times the color subcarrier by four to produce the color subcarrier, and dividing the clock frequency by some set of multiples to produce the horizontal scan rates with 227 cycles of color subcarrier per line plus one-half cycle.

4 Claims, 2 Drawing Figures

NTSC COLOR TELEVISION TRANSMISSION WITHOUT CHROMA CRAWL

BACKGROUND OF THE INVENTION

This invention relates to color television, and more particularly to a method and apparatus for an improved color television transmission that is free of chroma crawl and compatible with the standards of the National Television Systems Committee (NTSC).

The term "chroma crawl" refers to the effect of a jagged vertical edge of an image due to the color encoding and decoding process. The effect is most apparent at a border between contrasting colors. When viewed in a pattern of a calibrating color bar pattern, the jagged edge resembles a zipper. It will always be present in every video scene as a color distortion, and be quite noticeable, particularly in still pictures if viewed at a close distance. What is more disturbing is that the "teeth" of the "zipper" progress (crawl) upwardly on the screen. This can make the zipper effect very noticeable, even when viewed from a distance, because the color distortions produced on the image appear as waves, such as waves in the fabric of an article of apparel having a pattern of thin stripes, or some other pattern having parallel lines with a significant vertical component over substantial distances.

The NTSC color system transmits encoded color information on a subcarrier derived in the following way. First I and Q signals are derived from red (R), green (G), and blue (B) camera signals in a color matrix according to the following equations:

$$I = 0.6R - 0.28G - 0.32B$$

$$Q = 0.21R - 0.52G + 0.31B$$

Alternative color matrixing is given by the following equations:

$$I = 0.27(B-Y) + 0.74(R-Y)$$

$$Q = 0.41(B-Y) + 0.48(R-Y)$$

where Y is the luminance signal given by the equation:

$$Y = 0.30R + 0.59G + 0.11B$$

Then the I and Q signals are modulated by the subcarrier in phase for the I signal and in quadrature for the Q signal. At the receiver, the phase encoded I and Q color signals are decoded by synchronously demodulating the inphase and quadrature components to recover the I and Q color signals. A receiver matrix then recovers the R, G and B signals from the recovered I and Q signals, using Y signals, if necessary.

The monochromatic television standard already in place required a frame of 525 lines at a rate of 30 Hz using interlaced fields of 262.5 lines per field at a field rate of 60 Hz. This requires a horizontal scan rate of 15,750 Hz which produces a monochrome signal having components at integral multiples of the horizontal scan rate. In order to transmit the color subcarrier in the 6 MHz band alloted to a television channel by the FCC, it was necessary to select a color subcarrier frequency high in the picture carrier single sideband, but sufficiently below the sound carrier to avoid interfering with the audio signal, which is 4.5 MHz above the picture carrier. That placed the color subcarrier at about 3.6 MHz above the picture carrier. To avoid interference with the monochromatic video signal even that high in the single sideband of the video signal, the color subcarrier frequency was chosen to "interleave" in the gaps of the integral multiples of the line-scanning rate where there is no great amount of video information. These gaps occur at odd multiples of one-half the line-scanning rate.

This need to interleave the color subcarrier sidebands with the picture carrier single sideband thus required the color sub-carrier to be at some odd multiple of one-half the line-scanning rate, which is a multiple of 455 for the color subcarrier to be placed high in the video single sideband, but below the audio carrier. This odd multiple of half the line frequency also results in a minimum beat frequency with the audio carrier.

The precise color subcarrier chosen was 3,579,545 Hz to have 227.5 cycles of the color subcarrier per line scan, thus inverting the color subcarrier phase 180° for each successive line. That would tend to cancel any effect of interpreting luminance transitions of color in the demodulation process, but instead produced the effect described above called "chroma crawl." This is because each field has only 262.5 lines. The half line at the end causes the phase of the color subcarrier to be shifted only 90° for the beginning of the next field. So, in a sequence of four successive fields of two frames, the phase of the subcarrier is 0°, 270°, 180° and 90°. This is so because 227.5 Hz/line times 262.5 lines equals 59,718.75 cycles per field, and 119,437.5 cycles per frame. Consequently, on a field to field basis, the luminance transitions interpreted as color will appear, albeit to a lesser extent, and it will appear to crawl up the television screen.

SUMMARY OF THE INVENTION

In accordance with the present invention, the upward moving pattern at the edges of luminance is eliminated by control of the vertical scan rate to end each scan line with one full cycle of the color subcarrier, instead of one half of a cycle, by causing the horizontal sync generator to drop one half cycle at the end of each line. This is accomplished by feedback control on a clock pulse counter for the vertical and horizontal sync generator to reset at the end of every line, i.e., at the occurrence of every horizontal sync pulse (H), thereby shortening the line by one half cycle of the color subcarrier during each raster line. Consequently, there will be 227 cycles of the color subcarrier per line, instead of 227.5 cycles, except at the end of a field, for a phase inversion of the color subcarrier from field to field, thus eliminating chroma crawl. This is all done at the transmitter; the receiver will respond to the horizontal and vertical sync pulses (H and V) thus generated and transmitted to assure that each field displayed includes 525 lines of 227 cycles of the color carrier.

The novel features of the invention are set forth with particularity in the appended claims. The invention will best be understood from the following description when read in conjunction with the drawings.

DESCRIPTION OF PREFERRED EMBODIMENTS

Figure 1:
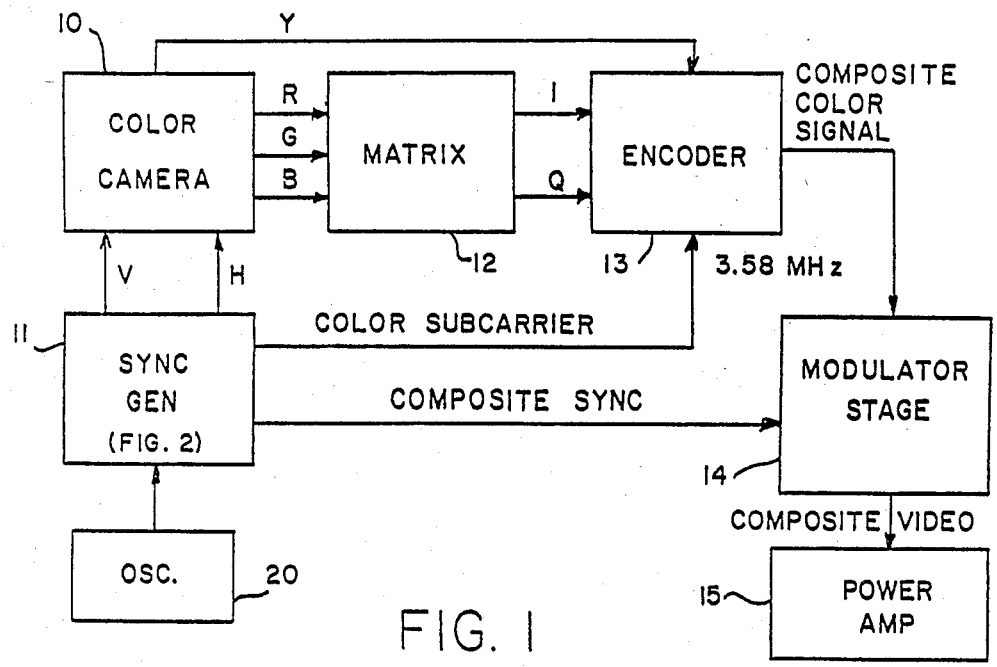
FIG. 1 is a general block diagram of a television camera connected to a transmission station, which may be a broadcast or cable station.

Referring first to FIG. 1, there is shown a color television camera 10 with an external sync generator 11 and a matrix 12 for combining red, green and blue color signals, or red, blue and luminance, to produce I and Q chroma signals to be encoded by a color subcarrier produced by the sync generator at precisely 3,579,545 Hz (usually by dividing down a crystal oscillator operating at four times the color subcarrier frequency).

For simplicity, it is assumed that direct luminance from the camera is used in an encoder 13 together with the color transmission primaries I and Q from the color matrix 12 to produce an NTSC composite color signal. A modulating stage 14 combines the composite color signal with a composite sync signal that includes not only the vertical and horizontal sync pulses (H and V) but also the color carrier bursts to form a composite video signal. The composite video signal is then carrier modulated and applied to a power amplifier 15 and to a transmitting antenna (not shown) for radiation to receivers, or to a cable system for transmission to receivers.

Figure 2:
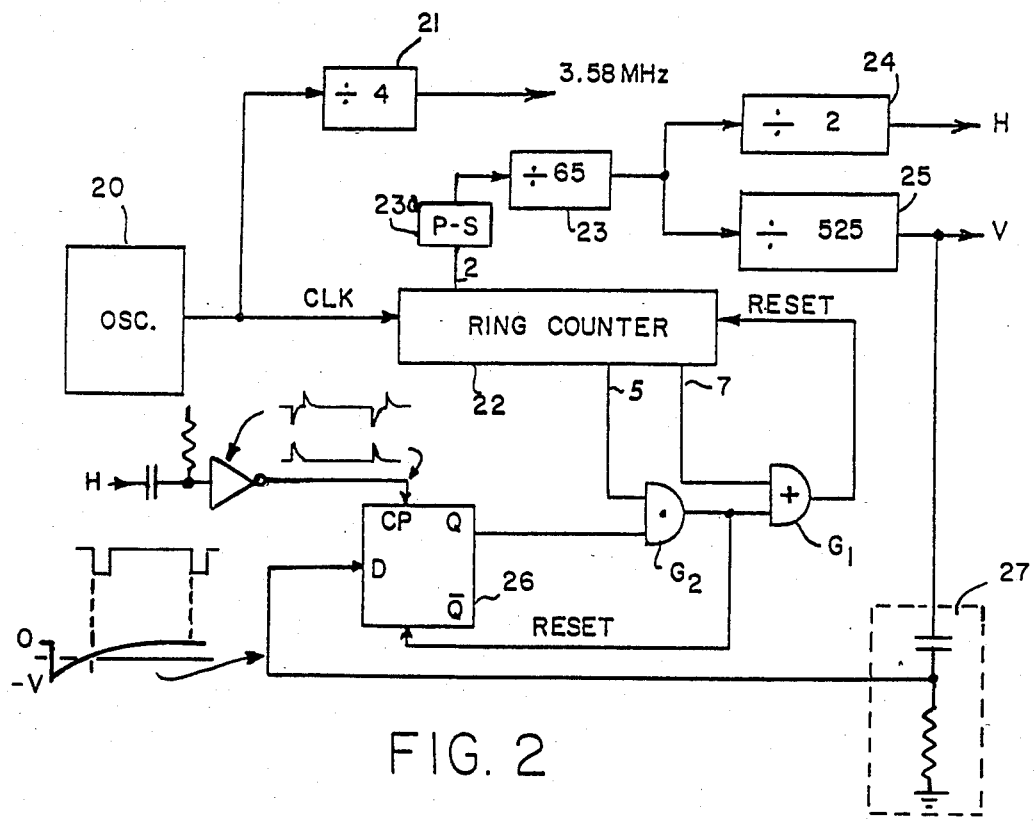
FIG. 2 is a functional block diagram of a preferred embodiment of the invention.

All of the foregoing is conventional in nature. What is new is the manner in which the vertical and horizontal sync pulses are generated to control the number of color carrier cycles per line and field, as will now be described with reference to FIG. 2. A crystal oscillator 20 generates a stable frequency that is four times the color subcarrier of about 3.58 MHz. A divide-by-four counter 21 then produces the stable color subcarrier required by the encoder 13 (FIG. 1).

The output of the oscillator 20 is also divided down by a counter 22 to generate a lower frequency signal used to generate the horizontal and vertical sync pulses. This is done by arranging for a normal reset feedback via an OR gate $G_1$ to cause dividing the input by seven. This may be done with a 74HC4017 integrated circuit which normally divides the input by ten, but may be done by a 7-stage ring counter that produces successive output pulses at stages 1 through 7, and then automatically recycles itself without the need of a feedback gate. What is illustrated is a 10-stage ring counter (the equivalent of the 74HC4017) with means for resetting the counter to zero after the seventh pulse is counted via the OR gate $G_1$ from the output count of 7. A divide-by-seven output thus produced is taken from an earlier count of 2 in each cycle of the counter. The frequency of that output (2,044,990 Hz) is then divided by 65 in a circuit 23 to obtain a frequency of 31,536 Hz, and then by 2 in a circuit 24 to obtain the horizontal sync pulse (H) at the rate of 15,768. The output of the circuit 23 is also divided by 525 in a circuit 25 to obtain a vertical sync pulse (V) at the NTSC rate of 60.07 Hz. In a preferred embodiment, a phase-stabilizer circuit 23a is included between pin 2 of the ring counter 22 and the frequency divider 23. Such a phase-stabilizer circuit may be implemented with a voltage controlled oscillator (VCO) having a crystal for control of its frequency at 2.044 MHz with feedback to a phase detector implemented with a balanced demodulator the output of which passes to the voltage control input of the VCO through an RC filter having a long time constant to eliminate jumps in phase at the H and V sync pulse outputs.

The OR gate $G_1$ also resets the ring counter 22 early from the count of 5 once during each raster (scan line) upon the setting of a D-type flip-flop 26 by a horizontal sync pulse (H). That enables an AND gate $G_2$, the output of which not only resets the ring counter 22 via the OR gate $G_1$ but also resets the D-type flip-flop. In that manner, two cycles of the input to the ring counter (which is 4 times the color subcarrier) is dropped once per line during the horizontal retrace. As a consequence, the horizontal scan frequency is advanced one half cycle of the color subcarrier at the start of every raster in order to provide 227 cycles of the color subcarrier during each raster, instead of 227.5 cycles as in the conventional implementation of the NTSC standard. The half cycle assures that during each scan line the color subcarrier will be precisely in phase. While this would eliminate the chroma crawl effect, it would create a more objectionable "picket fence" effect, which the NTSC system sought to avoid. Modern color television receivers and monitors employ comb filters, or notch filters, that will eliminate any vestige of the "picket fence" effect, but monochrome receivers are not so equipped. Therefore, to retain compatibility of the color television signal with monochrome receivers, it is necessary to alternate the phase of the color subcarrier for every field. To accomplish that, the vertical sync pulse inhibits the flip-flop 26 for one horizontal sync period. An RC circuit 27 is adjusted to stretch the leading edge of a negative vertical sync pulse for that period. As a consequence, instead of resetting the counter 22 early by one half cycle of the color subcarrier at every horizontal sync pulse, the counter is so reset at every horizontal sync pulse except the first one in each field (during vertical retrace) to shift the phase of the color subcarrier for the next field by half a color subcarrier cycle.

The result of freezing the in phase condition of the color subcarrier for all rasters of a field, and shifting the phase 180° during the vertical retrace period for the rasters of the next field, is that the "zipper effect" is not only made stationary, but the teeth of the zipper are made smaller, namely the size of one line width in height and a half cycle of the color subcarrier in depth. In conventional NTSC color television, the teeth are two line widths high and the zipper effect progresses (crawls) upwardly, due to the fact that the number of lines in a frame are not even, thus producing what is called "chroma crawl."

This freezing of the zipper effect by eliminating chroma crawl and reducing the size of the zipper teeth results in other advantages, such as obviating the need for "color framing" while running or editing video tape. This is so because line scans of each frame will be identical, i.e., all the line scan of a frame will be in phase with corresponding line scans of a successive frame. It also simplifies "freeze framing" for the reason that only two fields are required to complete a frame, and not four successive fields, and there is no need to decode and re-encode the color video when using two-field storage for freeze frames. Still other advantages are an improved picture with less flicker when converting to other international television standards, such as PAL and SECAM.

The luminance/chrominance artifacts of this improved color coding scheme are 180° out of phase from line to line of interlaced fields. This tends to cancel the visual perception of color artifacts due to visual integration. A conventional NTSC receiver will respond to vertical sync pulses of the modified composite video signal to achieve at the receiver precisely what is done at the camera, which is a field scan having 59,718.5 cycle of the color subcarrier per field. Otherwise, the desired 227.5 cycles of color subcarrier per line achieved under the conventional NTSC standard would be out of phase by 90° from field to field over four frames.

In the broadest aspects of the invention, this is accomplished by controlling the horizontal sync and the vertical sync to end each line with a full cycle of subcarrier, rather than controlling only the color subcarrier and horizontal sync to end each line with a half cycle of color subcarrier as in the NTSC system. The feature of the NTSC standard of inverting the color subcarrier phase every scan line of a frame is retained; what is changed by also controlling the horizontal and vertical sync is that the horizontal sync pulse interval is shortened by one half cycle of the color subcarrier every field to avoid the progressive phase shift of the color subcarrier from field to field by 90°, thus eliminating the "chroma crawl" effect present in conventional NTSC standard television. As an additional advantage, the color subcarrier and the aural carrier intermodulator beat is kept at a precise 180° phase reversal every scan line to cancel any intermodulation beat per line that may otherwise be present.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A method for an improved color television transmission compatible with NTSC standards of interlaced fields comprised of the steps of generating a color subcarrier at about 3,579,545 Hz by dividing down a clock frequency of four times the desired color subcarrier, dividing said clock frequency to produce a controlled horizontal scan rate at about 15,768 Hz with 227 cycles of color subcarrier per line, and dividing said clock frequency to produce a controlled vertical scan rate for interlaced fields, each at a rate of about 30.035 Hz with 59,718.5 cycles of said color subcarrier per field, and extending the horizontal shift pulse by the period of one half cycle of the color subcarrier, thereby to invert the phase of the color subcarrier during successive scan lines of interlaced fields.

2. A method as defined in claim 1 wherein said vertical scan rate is produced by dividing said clock frequency by some set of multiples to produce said horizontal and vertical scan rates with 227.5 cycles of color subcarrier per line, and once every scan line at the end thereof, skipping one half cycle period of said color subcarrier in the generation of the horizontal sync pulses except during a vertical sync pulse for the next field, thereby causing each field to have the color subcarrier with the same phase, and with the phase inverted every field of every interlaced frame so that the phase of the color subcarrier in each field is 180° out of phase with the color subcarrier of the next field.

3. In a color television transmission system compatible with NTSC standards, an improvement comprised of means for generating a color subcarrier at bout 3,579,545 Hz by dividing down a clock frequency of four times the desired color subcarrier, means for dividing said clock frequency to produce a controlled horizontal scan rate at about 15,768 Hz with 227 cycles of color subcarrier per line, and means for dividing said clock frequency to produce a controlled vertical sync pulse at a rate of about 60.07 Hz to produce frames of two interlaced fields, each at a rate of about 30.035 Hz with 59,718.5 cycles of said color subcarrier per field, and means for extending the horizontal sync period for the first line of every field by one half cycle of color subcarrier.

4. An improvement as defined in claim 3 wherein said means for producing said horizontal and vertical scan rates with 227 cycles of color subcarrier per line, is comprised of means for skipping two cycles of said clock frequency once every scan line at the end thereof in the generation of the horizontal sync pulses, except the first line of every field, whereby the color subcarrier during each scan line of every field is in phase and the horizontal sync pulses of each successive field are delayed one half cycle of the color subcarrier at the beginning of each field.

* * * * *